(12) United States Patent  
Guo (10) Patent No.: US 9,797,274 B2  
(45) Date of Patent: Oct. 24, 2017

(54) HIGH-EFFICIENCY POWER GENERATION SYSTEM

(71) Applicant: Songwei Guo, Minhang Shanghai (CN)

(72) Inventor: Songwei Guo, Minhang Shanghai (CN)

( * ) Notice: Subject to any disclaimer, the term of this patent is extended or adjusted under 35 U.S.C. 154(b) by 27 days.

(21) Appl. No.: 15/023,794

(22) PCT Filed: Nov. 18, 2014

(86) PCT No.: PCT/CN2014/091381  
§ 371 (c)(1),  
(2) Date: Mar. 22, 2016

(87) PCT Pub. No.: WO2015/043551  
PCT Pub. Date: Apr. 2, 2015

(65) Prior Publication Data  
US 2016/0230609 A1 Aug. 11, 2016

(30) Foreign Application Priority Data

Sep. 24, 2013 (CN) .......................... 2013 1 0438694  
Oct. 17, 2013 (CN) .......................... 2013 1 0487826

(51) Int. Cl.  
*F03G 7/06* (2006.01)  
*F01K 3/12* (2006.01)  
(Continued)

(52) U.S. Cl.  
CPC ................ *F01K 25/10* (2013.01); *F01K 3/12* (2013.01); *F01K 5/00* (2013.01); *F01K 27/005* (2013.01); *F03G 7/06* (2013.01)

(58) Field of Classification Search  
CPC ..... F03G 7/06; F01K 3/12; F01K 5/00; F01K 25/10; F01K 27/005  
See application file for complete search history.

(56) References Cited

U.S. PATENT DOCUMENTS 3,846,984 A 11/1974 Siegel  
2005/0198960 A1* 9/2005 Marnoch ................... F01K 3/12  
60/645

(Continued)

FOREIGN PATENT DOCUMENTS

CN 1773081 A 5/2006  
CN 101397983 A 4/2009  
CN 101509472 A 8/2009

OTHER PUBLICATIONS

International Searching Authority, International Search Report for International Application No. PCT/CN2014/091381, mailed Feb. 15, 2015.

*Primary Examiner* — Audrey K Bradley  
(74) *Attorney, Agent, or Firm* — Honigman Miller Schwartz and Cohn LLP; Matthew H. Szalach; Jonathan P. O'Brien (57) ABSTRACT

A high-efficiency power generation system includes: at least one first heat exchanger, inside which is full of a liquid actuating medium with a low boiling point; a hydraulic power generator; a gas-liquid recycling device; a liquefying device and a control device. The present disclosure accomplishes a recirculation for an entire power generating procedure through two steps including vaporization and a recycle of the actuating medium with a low boiling point by liquefaction. A technical difficulty in the conventional art that huge costs for realizing recycle of the actuating medium by a compressor, a booster pump, etc. can be overcome. In addition, since the present disclosure generate power through the liquid pressure rather than the gas pressure, the conversion efficiency can be improved and the requirement for performance of material for the system can be lowered, so that the economical efficiency and practicability for the entire system are highly improved.

11 Claims, 3 Drawing Sheets

(51) Int. Cl.
*F01K 25/10* (2006.01)
*F01K 27/00* (2006.01)
*F01K 5/00* (2006.01)

(56) References Cited

U.S. PATENT DOCUMENTS

2006/0059912 A1* 3/2006 Romanelli ............ F01K 27/005
    60/645
2010/0107634 A1    5/2010 Xu et al.

\* cited by examiner

HIGH-EFFICIENCY POWER GENERATION SYSTEM

CROSS REFERENCE TO RELATED APPLICATIONS

This application is the national phase of International Application No. PCT/CN2014/091381, filed on Nov. 18, 2014, which claims the benefit of priority to Chinese Patent Application No. 201310438694.2, filed on Sep. 24, 2013 and Chinese Patent Application No. 201310487826.0, filed on Oct. 17, 2013, the entire disclosure of which are incorporated herein by reference.

TECHNICAL FIELD

The present disclosure relates to a high-efficiency power generation system.

BACKGROUND

As is known to all, power generation currently is a producing procedure converting the heat energy of the fossil fuels (e.g., coal, oil, natural gas) and the nuclear energy into the electrical energy for supplying the demands for every national economy department and people's livelihood using a power plant. However, the fossil fuels produce a large amount of carbon dioxide which intensifies the earth greenhouse effect, and the nuclear energy is faced with huge challenges of being short of raw material and the environment protection.

Accordingly, the skilled in the art gradually starts generating power using clean energies such as the solar energy, the wind energy, the geothermal energy, the hydraulic power (the ocean energy), etc. However, the solar energy and the wind energy are strongly affected by the weather conditions, and the geothermal energy and the ocean energy are rigorously affected by the geographic conditions so that the geothermal energy and the ocean energy cannot be widely spread, and moreover, long term exploitation of the ocean energy may easily cause ecocatastrophe.

Therefore, the mankind is in an urgent need of a source of energy, which is both widely accessible and cheap. Thus, air all around, lakes, rivers grab the attentions of the insiders. Since all sources of energy on the surface of the earth come from the sun (the energy of volcano eruption is relative small, thus can be ignored), the energy brought by the solar rays continuously heat up air, lakes and rivers. If this part of energy can be extracted and used by the mankind, the issue of carbon dioxide exhaust will be addressed, ecocatastrophe and resource shortage can be avoided, and further, no limitation brought by the weather and geographic conditions.

With regard to this, the insiders gradually develop multiple types of power generation device using air or liquids, and specifically, using the heat energy of air or liquids to evaporate a liquid actuating medium with a low boiling point inside an evaporator, so that the generated steam with a high pressure goes through a steam turbine, which drives a power generator to generate power. However, in most cases, this kind of device realizes recycling the liquid actuating medium using a compressor, a booster pump, etc. Since both the compressor and the booster pump have a low efficiency, using the compressor to liquefy an actuating medium and, then, using the booster pump to drive the liquid actuating medium back into a high pressure zone cannot make both ends meet in costs, thus an overall efficiency of the device is very low. Furthermore, since the device mostly drives a power generator to generate power using a steam turbine, the higher the temperature of the high pressure steam entering into the steam turbine is, the higher the efficiency of the device is. However, the requirement for material of the steam turbine structure is correspondingly higher, which will greatly increase the costs of the device.

In the light of the aforementioned situation, there is a need for the improvement to the power generation system to save the costs and improve the efficiency of power generation.

SUMMARY

In order to solve the aforementioned problem in a conventional art, embodiments of the present disclosure provide a high-efficiency power generation system, which can highly improve the efficiency of power generation using a clean energy.

The embodiments of the present disclosure provide a high-efficiency power generation system including the following components.

At least one first heat exchanger, inside which is full of a liquid actuating medium with a low boiling point, is adapted to evaporate the liquid actuating medium with a low boiling point by a heat exchange between a first fluid inputted from external and the liquid actuating medium with a low boiling point, wherein the liquid actuating medium with a low boiling point have a boiling point at least one degree Celsius lower than the temperature of the first fluid.

A hydraulic power generator is included.

At least one gas-liquid recycling device includes: a first pressure vessel connected with the at least one first heat exchanger through a first valve is adapted to receive, when the first valve is open, a gaseous actuating medium with a low boiling point, which is outputted from the at least one first heat exchanger; the first pressure vessel is further connected with the hydraulic power generator through a second valve so that the first pressure vessel is further adapted to transport the liquid actuating medium with a low boiling point to the hydraulic power generator for making it work and generate power when the second valve is open; the first pressure vessel is further connected with the hydraulic power generator through a third valve so that the first pressure vessel is further adapted to receive the liquid actuating medium with a low boiling, which is outputted from the hydraulic power generator, when the third valve is open; and the first pressure vessel is further connected with the at least one first heat exchanger through a fourth valve so that the first pressure vessel is further adapted to return the liquid actuating medium with a low boiling point to the at least one first heat exchanger when the fourth valve is open;

a second pressure vessel connected with the at least one first heat exchanger through a sixth valve is adapted to receive the gaseous actuating medium with a low boiling point, which is outputted from the at least one first heat exchanger, when the sixth valve is open; the second pressure vessel is further connected with the hydraulic power generator through a seventh valve so that the second pressure vessel is further adapted to transport the liquid actuating medium with a low boiling point to the hydraulic power generator for making it work and generate power when the seventh valve is open; the second pressure vessel is further connected with the hydraulic power generator through an eighth valve so that the second pressure vessel is further adapted to receive the liquid actuating medium with a low boiling point, which is outputted from the hydraulic power generator when the eighth valve is open; the second pressure vessel is further connected with the at least one first heat exchanger through a ninth valve so that the second pressure vessel is further adapted to transport the liquid actuating medium with a low boiling point to the at least one first heat exchanger when the ninth valve is open; and two liquid level sensors, which are disposed at the bottom of the first pressure vessel and the second pressure vessel respectively, are adapted to each detect a liquid level of the liquid actuating medium with a low boiling point inside the first pressure vessel and the second pressure vessel, and at least one of the two liquid level sensors is further adapted to output a liquid level signal.

At least one liquefaction device includes a water nozzle mechanism and a second heat exchanger, wherein the second heat exchanger is connected with the first pressure vessel through a fifth valve and with the second pressure vessel through a tenth valve, thus the second heat exchanger is adapted to receive the gaseous actuating medium with a low boiling point overflowing from the first pressure vessel when the fifth valve is open and to receive the gaseous actuating medium with a low boiling point overflowing from the second pressure vessel when the tenth valve is open; the second heat exchanger is further adapted to make the gaseous actuating medium with a low boiling point return to the first pressure vessel and the second pressure vessel after the gaseous actuating medium with a low boiling point being liquefied through a heat exchange with a second fluid entering from external and being sprayed by the water nozzle mechanism.

And, a control device is adapted to control turning on and off of the at least one first heat exchanger, the water nozzle mechanism and the second heat exchanger, and further adapted to control open and close of the valves from the first valve to the tenth valve, wherein the first valve, the second valve, the fourth valve, the eighth valve and the tenth valve have a same open-close state, wherein the third valve, the fifth valve, the sixth valve, the seventh valve and the ninth valve have a same open-close state, wherein the first valve, the second valve, the fourth valve, the eighth valve and the tenth valve have a different open-close state from the third valve, the fifth valve, the sixth valve, the seventh valve and the ninth valve; the control device is further adapted to receive the liquid level signal outputted from the two liquid level sensors and compare the liquid level signal to a predetermined threshold, wherein if a liquid level of the liquid actuating medium with a low boiling point is lower than the predetermined threshold, the open-close state of the first valve to the tenth valve is switched.

Wherein, at an initial state, the first pressure vessel includes the liquid actuating medium with a low boiling point and the second pressure vessel is vacuum, and, at the initial state, the control device controls the first valve, the second valve, the fourth valve, the eighth valve and the tenth valve open.

In some embodiments, the at least one first heat exchanger is a fan heat exchanger when the first fluid is air.

In some embodiments, the at least one first heat exchanger is a plate heat exchanger when the first fluid is a liquid.

In some embodiments, the high-efficiency power generation system further include a transmission pump connected with the at least one first heat exchanger is adapted to provide the first fluid to the at least one first heat exchanger.

In some embodiments, the second heat exchanger is a fan heat exchanger when the second fluid is air.

In some embodiments, the second heat exchanger has an entrance for the second fluid to flow inside, and the water nozzle mechanism is disposed at the entrance.

In some embodiments, the hydraulic power generator is further connected with the water nozzle mechanism, the at least one first heat exchanger, the second heat exchanger and the control device and further adapted to provide power to compensate the water nozzle mechanism, the at least one first heat exchanger, the second heat exchanger and the control device.

In some embodiments, a boiling point of the actuating medium with a low boiling point ranges from 100 degrees Celsius above zero degree Celsius to 272 degrees Celsius below zero degree Celsius under one standard atmosphere.

In some embodiments, the actuating medium with a low boiling point is the cooling medium R22 or the cooling medium R-410A.

In some embodiments, all of the valves from the first valve to the tenth valve are electro-magnetic valves.

Since the aforementioned technical solution is implemented, the embodiments of the present disclosure take advantage of a saturated gas-liquid coexisting zone for a liquid with a temperature above a boiling point and below a critical point and a principle that the pressure of the saturated steam changes with temperature. A saturated gas-liquid coexisting phenomenon takes place inside a sealed first pressure vessel of a gas-liquid recycling device and a saturated steam pressure is obtained by a heat exchange between an actuating medium with a low boiling point and a first fluid (e.g., the normal temperature air or the liquids from rivers, lakes, etc.). Then, a second pressure vessel connected with the first pressure vessel is cooled down through a liquefying device using the evaporative cooling technology. By taking advantage of the pressure difference between the first pressure vessel and the second pressure vessel, a hydraulic power generator between the first pressure vessel and the second pressure vessel is driven to generate power. From above, the embodiments of the present disclosure accomplish a recirculation for an entire power generating procedure through two steps including vaporization and a recycle of the actuating medium with a low boiling point by liquefaction. Further, a cooling process is performed in a way of cooling down by evaporating water so as to increase temperature difference between two pressure vessels, which results in a larger difference in pressure to serve for generating power. A technical difficulty in the conventional art that huge costs for realizing recycle of the actuating medium by the compressor, the booster pump, etc. can be overcome. In addition, since the embodiments of the present disclosure generate power through the liquid pressure rather than the gas pressure commonly used in the conventional art, the conversion efficiency can be improved and the requirement for performance of material for the system can be lowered, so that the economical efficiency and practicability for the entire system are highly improved.

DETAILED DESCRIPTION

Hereinafter, in conjunction with figures, embodiments of the present disclosure are provided with detailed descriptions.

Figure 1:
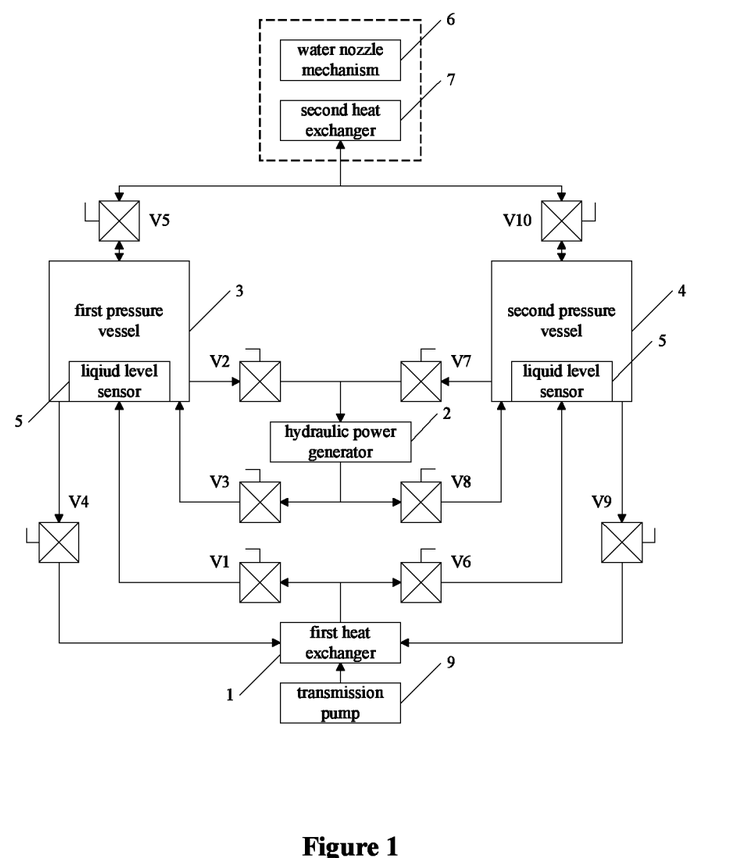
FIG. 1 schematically illustrates a structural diagram for a high-efficiency power generation system according to an embodiment in the present disclosure.
Figure 3:
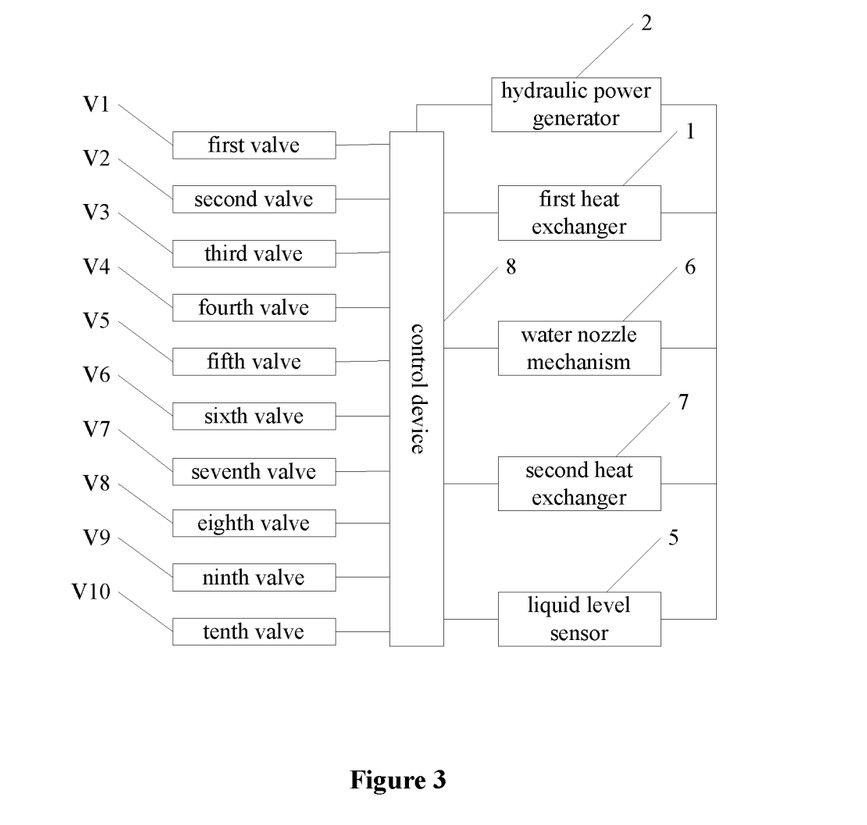
FIG. 3 illustrates a block diagram for a circuit in a high-efficiency power generation system according to an embodiment in the present disclosure.

Referring to FIGS. 1 and 3, in an embodiment of the present disclosure, a high-efficiency power generation system includes: a first heat exchanger 1, inside which is full of a liquid actuating medium with a low boiling point; a hydraulic power generator 2; a gas-liquid recycling device; a liquefying device and a control device 8.

The heat exchanger 1 is adapted to evaporate the liquid actuating medium with a low boiling point through heat exchange between a first fluid inputted from external and the liquid actuating medium with a low boiling point, where the boiling point is at least one degree Celsius lower than the temperature of the first fluid, and preferably, at least five degrees Celsius lower than the temperature of the first fluid. In this embodiment, the first fluid is a liquid (e.g., fresh water such as water from rivers, lakes, streams, etc. and other available liquid with waste heat). The first heat exchanger 1 is a plate heat exchanger, where the first heat exchanger 1 receives the first fluid through a transmission pump 9. It is noted that the first fluid in the embodiment of the present disclosure may be air, where, if the first fluid is air, the first heat exchanger 1 is a fan heat exchanger and a transmission pump 9 is not required.

The gas-liquid recycling device includes the first pressure vessel 3, the second pressure vessel 4 and two liquid sensors 5.

The first pressure vessel 3 is connected with the first heat exchanger 1 through a first valve V1 so that the first pressure vessel 3 is adapted to, when the first valve V1 is open, receive a gaseous actuating medium with a low boiling point outputted from the first heat exchanger 1. The first pressure vessel 3 is further connected with the hydraulic power generator 2 through a second valve V2 so that the first pressure vessel 3 is further adapted to, when the second valve V2 is open, transport the liquid actuating medium with a low boiling point to the hydraulic power generator 2 for making it work and generate power. The first pressure vessel 3 is further connected with the hydraulic power generator 2 through a third valve V3 so that the first pressure vessel 3 is further adapted to, when the third valve V3 is open, receive the liquid actuating medium with a low boiling outputted from the hydraulic power generator 2. The first pressure vessel 3 is further connected with the first heat exchanger 1 through a fourth valve V4 so that the first pressure vessel 3 is further adapted to, when the fourth valve V4 is open, return the liquid actuating medium with a low boiling point to the first heat exchanger 1.

The second pressure vessel 4 is connected with the first heat exchanger 1 through a sixth valve V6 so that the second pressure vessel 4 is adapted to, when the sixth valve V6 is open, receive the gaseous actuating medium with a low boiling point outputted from the first heat exchanger 1. The second pressure vessel 4 is further connected with the hydraulic power generator 2 through a seventh valve V7 so that the second pressure vessel 4 is further adapted to, when the seventh valve V7 is open, transport the liquid actuating medium with a low boiling point to the hydraulic power generator 2 for making it work and generate power. The second pressure vessel 4 is further connected with the hydraulic power generator 2 through an eighth valve V8 so that the second pressure vessel 4 is further adapted to, when the eighth valve V8 is open, receive the liquid actuating medium with a low boiling point outputted from the hydraulic power generator 2. The second pressure vessel 4 is further connected with the first heat exchanger 1 through a ninth valve V9 so that the second pressure vessel 4 is further adapted to, when the ninth valve V9 is open, transport the liquid actuating medium with a low boiling point to the first heat exchanger 1 (if the first heat exchanger 1 is a plate heat exchanger, the fourth valve V4 and the ninth valve V9 may be connected with the first heat exchanger 1 through a transmission pump so that the liquid actuating medium with a low boiling point may return to the first heat exchanger 1 more quickly).

Two liquid sensors 5 are disposed at the bottom of the first pressure vessel 3 and the second pressure vessel 4 respectively, where the two liquid sensors 5 are adapted to detect a liquid level of the liquid actuating medium with a low boiling point inside the first pressure vessel 3 and the second pressure vessel 4, and at least one of the two liquid sensors 5 is further adapted to output a liquid level signal. In this embodiment, the two liquid sensors 5 may be capacitive sensors, electronic sensors, float sensors, pressure sensors, or ultrasonic sensors, etc. which are available in a market.

The liquefying device specifically include: a water nozzle mechanism 6 and a second heat exchanger 7, where the second heat exchanger 7 is connected with the first pressure vessel 3 through a fifth valve V5 and to the second pressure vessel 4 through a tenth valve V10. Thus, the second heat exchanger 7 is adapted to receive the gaseous actuating medium with a low boiling point overflowing from the first pressure vessel 3 when the fifth valve V5 is open and to receive the gaseous actuating medium with a low boiling point overflowing from the second pressure vessel 4 when the tenth valve V10 is open. The second heat exchanger 7 is further adapted to make the gaseous actuating medium with a low boiling point return to the first pressure vessel V3 and the second pressure vessel V4 after the gaseous actuating medium with a low boiling point being liquefied through a heat exchange with a second fluid entering from external and being sprayed by the water nozzle mechanism 6. In this embodiment, the second fluid is air, and the second heat exchanger 7 is a fan heat exchanger, where the second heat exchanger 7 has an entrance for the second fluid, and the water nozzle mechanism 6 is disposed at the entrance.

The control device 8 is adapted to control turning on and off for the first heat exchanger 1, the water nozzle mechanism 6 and the second heat exchanger 7, and further adapted to control open and close for the first valve V1 to the tenth valve V10 (in this embodiment, all of the valves from the first valve V1 to the tenth valve V10 are electro-magnetic valves). Wherein, the first valve V1, the second valve V2, the fourth valve V4, the eighth valve V8 and the tenth valve V10 have a same open-close state. Wherein, the third valve V3, the fifth valve V5, the sixth valve V6, the seventh valve V7 and the ninth valve V9 have a same open-close state. Wherein, the first valve V1, the second valve V2, the fourth valve V4, the eighth valve V8 and the tenth valve V10 have a different open-close state from the third valve V3, the fifth valve V5, the sixth valve V6, the seventh valve V7 and the ninth valve V9. The control device 8 is further adapted to receive the liquid level signal outputted from the two liquid level sensors 5 and compare the liquid level signal to a predetermined threshold. If a liquid level of the liquid actuating medium with a low boiling point is lower than the predetermined threshold, the open-close state of the first valve V1 to the tenth valve V10 is switched.

In an embodiment, at an initial state, the first pressure vessel 3 includes the liquid actuating medium with a low boiling point and the second pressure vessel 4 is vacuum. Moreover, at the initial state, the control device 8 controls the first valve V1, the second valve V2, the fourth valve V4, the eighth valve V8 and the tenth valve V10 open.

Based on the aforementioned structure, the operating principle of the embodiment of the present disclosure is presented below.

Prior to startup of the system, the entire device is vacuumized, and then, the liquid actuating medium with a low boiling point is injected into the first heat exchanger 1, the hydraulic power generator 2, the first pressure vessel 3 and pipes connecting them. Further, the control device 8 controls the first valve V1, the second valve V2, the fourth valve V4, the eighth valve V8 and the tenth valve V10 open and controls the third valve V3, the fifth valve V5, the sixth valve V6, the seventh valve V7 and the ninth valve V9 closed.

At a temporary startup by an external power, the first heat exchanger 1 and the second heat exchanger 7 start running and the water nozzle mechanism 6 starts working simultaneously. The liquid actuating medium inside the first heat exchanger 1 exchanges heat with the first fluid and then, starts boiling so as to form the gaseous actuating medium, where the gaseous actuating medium rises to an upper level inside the first pressure vessel 3 through the first valve V1 till a state of saturated steam pressure (in a sealed condition, under a certain temperature, the pressure of steam balanced with a gas or a liquid is called the saturated steam pressure) is reached. On the one hand, the liquid actuating medium inside the first pressure vessel 3 returns to the first heat exchanger 1 through the fourth valve V4 under the pressure from the gas at the upper level. On the other hand, since the vaccum second pressure vessel 4 is connected with one end of the hydraulic power generator 2, the liquid actuating medium inside the first pressure vessel 3 flows to the hydraulic power generator 2 through the second valve V2 under the pressure from the gas at an upper level and then flow into the second pressure vessel 4 through the eighth valve V8 after the hydraulic power generator 2 does work and generates power. Herein, the hydraulic power generator 2 is further connected with the water nozzle mechanism 6, the first heat exchanger 1, the second heat exchanger 7 and the control device 8 so that the power generated by the hydraulic power generator 2 returns to compensate the water nozzle mechanism 6, the first heat exchanger 1, the second heat exchanger 7 and the control device 8 and the remaining power is transmitted externally. In the aforementioned procedure, since the liquid actuating medium continuously flows into the second pressure vessel 4 so that the liquid level in the second pressure vessel 4, which is vaccum initially, rises and the pressure is increased. Then, the gaseous actuating medium overflowing from the second pressure vessel 4 enters the second heat exchanger 7 through the tenth valve V10. Along with operation of the water nozzle mechanism 6, the gaseous actuating medium is cooled down and liquefied to the liquid actuating medium by evaporating the wet second fluid and then, returns to the second pressure vessel 4 again through the tenth valve V10 so that the pressure in the second pressure vessel 4 drops to ensure there is a pressure difference between the second pressure vessel 4 and the first pressure vessel 3. Thus, liquid actuating medium in the first pressure vessel 3 continuously flows into the hydraulic power generator 2 till the control device 8 detects the liquid level in the first pressure vessel 3 is below the predetermined threshold using the corresponding one of the two liquid level sensors 5 in the first pressure vessel 3. At this moment, the control device 8 switches the open-close state of the valves from the first valve V1 to the tenth valve V10. That is, the first valve V1, the second valve V2, the fourth valve V4, the eighth valve V8 and the tenth valve V10 are closed, and the third valve V3, the fifth valve V5, the sixth valve V6, the seventh valve V7 and the ninth valve V9 are open.

Accordingly, the gaseous actuating medium generated in the first heat exchanger 1 then rises to an upper level in the second pressure vessel 4 through the sixth valve V6 till a state of saturated steam pressure is reached. On the one hand, the liquid actuating medium inside the second pressure vessel 4 returns to the first heat exchanger 1 through the ninth valve V9 under the pressure from the gas at the upper level. On the other hand, since the second heat exchanger 7 is connected with the first pressure vessel 3 through the fifth valve V5, the temperature inside the first pressure vessel 3, which is connected with the another end of the hydraulic power generator, drops because of cooling down by the second heat exchanger 7, and further, the saturated steam pressure inside the first pressure vessel 3 drops (same principle as described before, no further description will be provided). Since there is a pressure difference formed between the first pressure vessel 3 and the second pressure vessel 4, the liquid actuating medium at a lower level in the second pressure vessel 4 flows into the hydraulic power generator 2 through the seventh valve V7 under the pressure by the gas at the upper level and, after the hydraulic power generator 2 does work and generates power, flows into the first pressure vessel 3 through the seventh valve V7. Similarly, the power generated by the hydraulic power generator 2 returns to the water nozzle mechanism 6, the first heat exchanger 1, the second heat exchanger 7 and the control device 8 and the remaining power is transmitted externally. Similarly, in the aforementioned procedure, since the liquid actuating medium continuously flows into the first pressure vessel 3 so that the liquid level in the first pressure vessel 3 rises and the pressure is increased. Then, the gaseous actuating medium overflowing from the second first pressure vessel 3 enters the second heat exchanger 7 through the fifth valve V5. Along with the operation of the water nozzle mechanism 6, the gaseous actuating medium is cooled down and liquefied to the liquid actuating medium by evaporating the wet second fluid and then, returns to the first pressure vessel 3 again through the fifth valve V5 so that the pressure in the first pressure vessel 3 drops to ensure there is a pressure difference between the second pressure vessel 4 and the first pressure vessel 3. Thus, the liquid actuating medium in the second pressure vessel 4 continuously flows into the hydraulic power generator 2 till the control device 8 detects the liquid level in the second pressure vessel 4 is below the predetermined threshold using the corresponding one of the two liquid level sensors 5 in the second pressure vessel 4. At this moment, the control device 8 switches the open-close state of the first valve V1 to the tenth valve V10.

So far, the system runs normally. Every time the liquid level in the first pressure vessel 3 or the second pressure vessel 4 is below the predetermined threshold, the control device 8 will immediately switch all of the valves, and then, the system starts a new turn for generating power.

In this embodiment, the actuating medium with a low boiling point may be the cooling medium R22 (chlorodifuoromethane). By looking up the saturation temperature-pressure chart that is known for the cooling medium R22, it is appreciated that, for every 5 degrees Celsius drop in temperature of the cooling medium R22, the pressure will decrease at least 0.1 MPa(A). Since the current cooling technology by evaporating water can ensure more than 5 degrees Celsius drop to a target object for a temperature environment above 0 degree Celsius, the system can generate a pressure more than 0.1 MPa(A) for power generation in most weather conditions, which results in that the system possesses more practicability. It is noticed that, since numerous actuating mediums can be used for a boiling point ranging from 100 degrees Celsius (including 100 degrees) to −272 degrees Celsius under one standard atmosphere, it is hard to list each of the numerous actuating mediums so that the embodiments of the present disclosure take the cooling medium R22 as an example. Actually, for a fixed temperature difference, there are many liquids with a greater saturated steam pressure difference, thus the actuating medium can be selected based on practical situations in real industry implementation. For example, the environmental cooling medium Genetron AZ-20 (the azeotrope of HFC-32/HFC-125, which is called R-410A by ASHRAE) developed by Honeywell may also be used as the actuating medium with a low boiling point. The basic selecting criterion is that the greater the corresponding pressure to the material drops for every one degree Celsius down, the better, and the lower the evaporation potential for the material is, the better.

Figure 2:
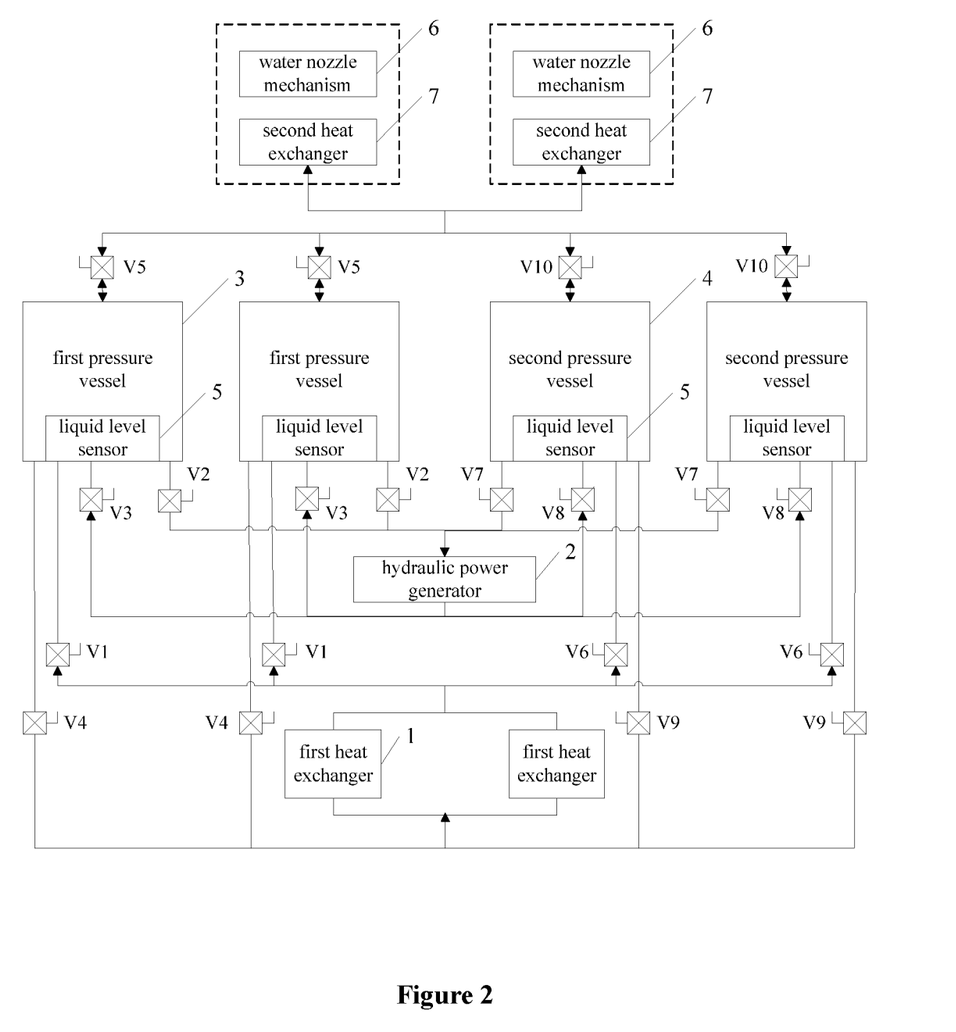
FIG. 2 schematically illustrates a structural diagram for a high-efficiency power generation system according to an embodiment in the present disclosure.

It is noticed that, in the embodiments of the present disclosure, multiple first heat exchangers 1, multiple gas-liquid recycling devices and multiple liquefaction devices may be included in order for improving the overall output power of the system (surely, the output power of the system may also be improved by only increasing the volume of the pressure vessel or the power of the heat exchanger). Referring to FIG. 2, in another embodiment of the system in the present disclosure, the system includes two first heat exchangers 1 disposed in parallel, two gas-liquid recycling devices disposed in parallel and two liquefaction devices disposed in parallel (since the structure and the operating mechanism of the system are similar to the embodiment described before, no further description will be provided). In addition, since a valve switch may generate an impact on stable operation for a hydraulic power generator, the impact on the hydraulic power generator may be reduced by performing switch using multiple pressure vessels in rotation.

Furthermore, it is noted that, when the system is in an extreme environment, for example, the Arctic ocean, seawater can be used for heating up the liquid actuating medium, and, moreover, since the environmental temperature is greatly lower than the temperature of the gaseous actuating medium, the control device 8 stops the water nozzle mechanism 6 from working, and only using a fan heat exchanger as the second heat exchanger 7 to realize cooling down and liquefaction for the actuating medium (since there is a huge difference between the transferred heat amount of a fan heat exchanger and the input power of the fan, which results in that the system initially have adequate energy for dealing with the loss in the each following step, thus the system can possess more economical efficiency and practicability).

Above all, the embodiments of the present disclosure take advantage of the sensitivity of an actuating medium with a low boiling point to a room temperature to form a man-made temperature difference so that a pressure difference is formed for generating power, thus the energy can be continuously and efficiently extracted from air, lakes and rivers. Moreover, in the procedure, by implementing a cooling technology by evaporating water, the embodiments of the present disclosure realize exchanging the huge vaporization potential in water with the huge liquefaction potential released when an actuating medium with a low boiling point is being liquefied using a water nozzle mechanism, so that the issue that large energy consumptions are required for recycling gaseous actuating mediums is addressed in a most economical way. Moreover, it is realized through the structure that the actuating medium in one pressure vessel is vaporized and do work, which can contribute for liquefying the actuating medium in the other pressure vessel. Therefore, no additional energy is required for injecting a liquid actuating medium in a low pressure zone into a high pressure zone so that the energy consumptions of the system is reduced highly and the power generation efficiency of the system is improved.

The disclosure is disclosed, but not limited, by preferred embodiments as above. Based on the disclosure of the disclosure, any variation and modification can be made to the embodiments of the present disclosure. That is, any simple modification, variation and polishing based on the specification and claims of the present disclosure is within the scope of the present disclosure. Well-known knowledge in the art is not described in detail in the embodiments of the present disclosure.

What is claimed is:

1. A high-efficiency power generation system, comprising:
   at least one first heat exchanger, inside which is full of a liquid actuating medium with a low boiling point, adapted to evaporate the liquid actuating medium with a low boiling point by a heat exchange between a first fluid inputted from external and the liquid actuating medium with a low boiling point, wherein the liquid actuating medium with a low boiling point has a boiling point at least one degree Celsius lower than the temperature of the first fluid;
   a hydraulic power generator;
   at least one gas-liquid recycling device, comprising:
   a first pressure vessel connected with the at least one first heat exchanger through a first valve is adapted to receive, when the first valve is open, a gaseous actuating medium with a low boiling point, which is outputted from the at least one first heat exchanger; the first pressure vessel is further connected with the hydraulic power generator through a second valve so that the first pressure vessel is further adapted to transport the liquid actuating medium with a low boiling point to the hydraulic power generator for making it work and generate power when the second valve is open; the first pressure vessel is further connected with the hydraulic power generator through a third valve so that the first pressure vessel is further adapted to receive the liquid actuating medium with a low boiling, which is outputted from the hydraulic power generator, when the third valve is open; and the first pressure vessel is further connected with the at least one first heat exchanger through a fourth valve so that the first pressure vessel is further adapted to return the liquid actuating medium with a low boiling point to the at least one first heat exchanger when the fourth valve is open;
   a second pressure vessel connected with the at least one first heat exchanger through a sixth valve is adapted to receive the gaseous actuating medium with a low boiling point, which is outputted from the at least one first heat exchanger, when the sixth valve is open; the second pressure vessel is further connected with the hydraulic power generator through a seventh valve so that the second pressure vessel is further adapted to transport the liquid actuating medium with a low boiling point to the hydraulic power generator for making it work and generate power when the seventh valve is open; the second pressure vessel is further connected with the hydraulic power generator through an eighth valve so that the second pressure vessel is further adapted to receive the liquid actuating medium with a low boiling point, which is outputted from the hydraulic power generator when the eighth valve is open; the second pressure vessel is further connected with the at least one first heat exchanger through a ninth valve so that the second pressure vessel is further adapted to transport the liquid actuating medium with a low boiling point to the at least one first heat exchanger when the ninth valve is open; and two liquid level sensors, which are disposed at the bottom of the first pressure vessel and the second pressure vessel respectively, are adapted to each detect a liquid level of the liquid actuating medium with a low boiling point inside the first pressure vessel and the second pressure vessel, and at least one of the two liquid level sensors is further adapted to output a liquid level signal;

at least one liquefaction device, comprising a water nozzle mechanism and a second heat exchanger, wherein the second heat exchanger is connected with the first pressure vessel through a fifth valve and with the second pressure vessel through a tenth valve, thus the second heat exchanger is adapted to receive the gaseous actuating medium with a low boiling point overflowing from the first pressure vessel when the fifth valve is open and to receive the gaseous actuating medium with a low boiling point overflowing from the second pressure vessel when the tenth valve is open; the second heat exchanger is further adapted to make the gaseous actuating medium with a low boiling point return to the first pressure vessel and the second pressure vessel after the gaseous actuating medium with a low boiling point being liquefied through a heat exchange with a second fluid entering from external and being sprayed by the water nozzle mechanism; and a control device, adapted to control turning on and off of the at least one first heat exchanger, the water nozzle mechanism and the second heat exchanger, and further adapted to control open and close of the valves from the first valve to the tenth valve, wherein the first valve, the second valve, the fourth valve, the eighth valve and the tenth valve have a same open-close state, wherein the third valve, the fifth valve, the sixth valve, the seventh valve and the ninth valve have a same open-close state, wherein the first valve, the second valve, the fourth valve, the eighth valve and the tenth valve have a different open-close state from the third valve, the fifth valve, the sixth valve, the seventh valve and the ninth valve; the control device is further adapted to receive the liquid level signal outputted from the two liquid level sensors and compare the liquid level signal to a predetermined threshold, wherein if a liquid level of the liquid actuating medium with a low boiling point is lower than the predetermined threshold, the open-close state of the first valve to the tenth valve is switched;

wherein, at an initial state, the first pressure vessel comprises the liquid actuating medium with a low boiling point and the second pressure vessel is vacuum, and, at the initial state, the control device controls the first valve, the second valve, the fourth valve, the eighth valve and the tenth valve open.

2. The high-efficiency power generation system according to claim 1, wherein the at least one first heat exchanger is a fan heat exchanger and the first fluid is air.

3. The high-efficiency power generation system according to claim 1, wherein the second heat exchanger comprises an entrance for the second fluid to flow inside, and the water nozzle mechanism is disposed at the entrance.

4. The high-efficiency power generation system according to claim 1, wherein the hydraulic power generator is further connected with the water nozzle mechanism, the at least one first heat exchanger, the second heat exchanger and the control device and further adapted to provide power to compensate the water nozzle mechanism, the at least one first heat exchanger, the second heat exchanger and the control device.

5. The high-efficiency power generation system according to claim 1, wherein all of the valves from the first valve to the tenth valve are electro-magnetic valves.

6. The high-efficiency power generation system according to claim 1, wherein the at least one first heat exchanger is a plate heat exchanger and the first fluid is a liquid.

7. The high-efficiency power generation system according to claim 6, further comprising: a transmission pump connected with the at least one first heat exchanger adapted to provide the first fluid to the at least one first heat exchanger.

8. The high-efficiency power generation system according to claim 1, wherein the second heat exchanger is a fan heat exchanger and the second fluid is air.

9. The high-efficiency power generation system according to claim 8, wherein the second heat exchanger comprises an entrance for the second fluid to flow inside, and the water nozzle mechanism is disposed at the entrance.

10. The high-efficiency power generation system according to claim 1, wherein a boiling point of the actuating medium with a low boiling point ranges from 100 degrees Celsius above zero degree Celsius to 272 degrees Celsius below zero degree Celsius under one standard atmosphere.

11. The high-efficiency power generation system according to claim 10, wherein the actuating medium with a low boiling point is the cooling medium R22 or the cooling medium R-410A.

* * * * *